United States Patent
Hooper

[15] 3,641,827
[45] Feb. 15, 1972

[54] TORQUE TRANSMITTING APPARATUS
[72] Inventor: Gerald H. Hooper, 331 Galli Court, Los Altos, Calif. 94022
[22] Filed: Apr. 22, 1970
[21] Appl. No.: 30,901

[52] U.S. Cl. ................................................. 74/18.1, 74/66
[51] Int. Cl. ................................................. F16j 15/52
[58] Field of Search ............... 74/18.1, 18, 18.2, 17.8, 66, 74/69

[56] References Cited

UNITED STATES PATENTS

| | | | |
|---|---|---|---|
| 3,028,761 | 4/1962 | Cole, Jr. | 74/18 X |
| 2,119,955 | 6/1938 | Litton | 74/18.1 X |

Primary Examiner—William F. O'Dea
Assistant Examiner—F. D. Shoemaker
Attorney—Jack M. Wiseman

[57] ABSTRACT

Apparatus for the transmission of torque through a partition. The apparatus utilizes a plurality of torque rods driven respectively in a planar pivotal or a "seesaw" movement. The torque rods are driven by radially disposed links, which, in turn, are actuated by a pin. The pin is attached to one end of a crank arm and the other end of the crank arm is attached to a shaft. The pin rotates concentrically relative to axis of the shaft. The torque rods, in turn, rotate an arm at the opposite end in a rotary motion to operate a driven shaft. The apparatus may be employed for the transmission of torque to or from hermetically sealed chambers.

14 Claims, 12 Drawing Figures

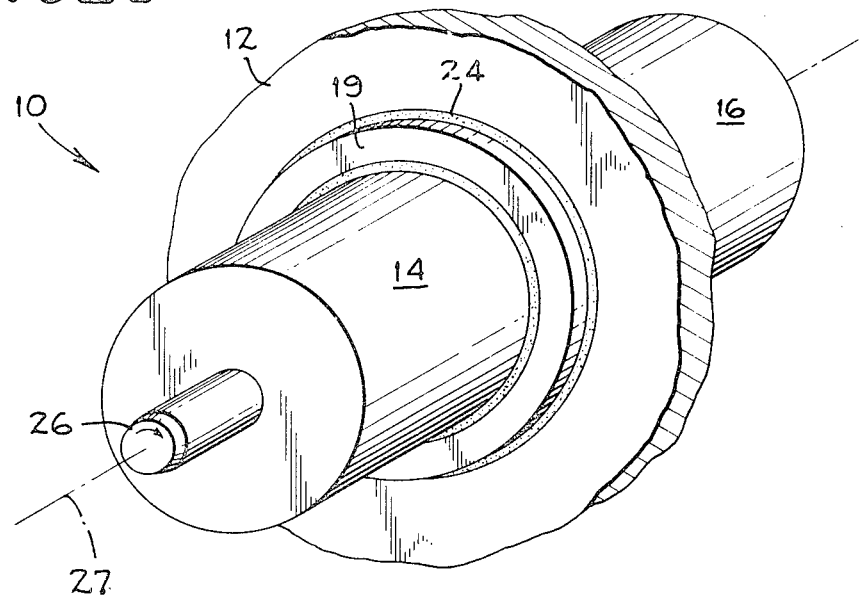
Fig_1
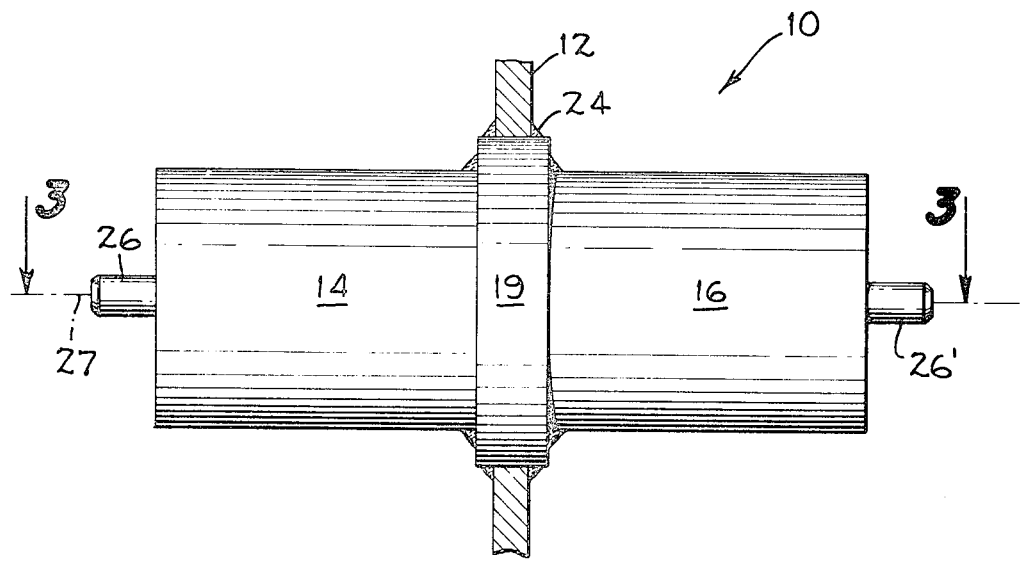
Fig_2
INVENTOR.
GERALD H. HOOPER
BY Jack M. Wiseman
ATTORNEY

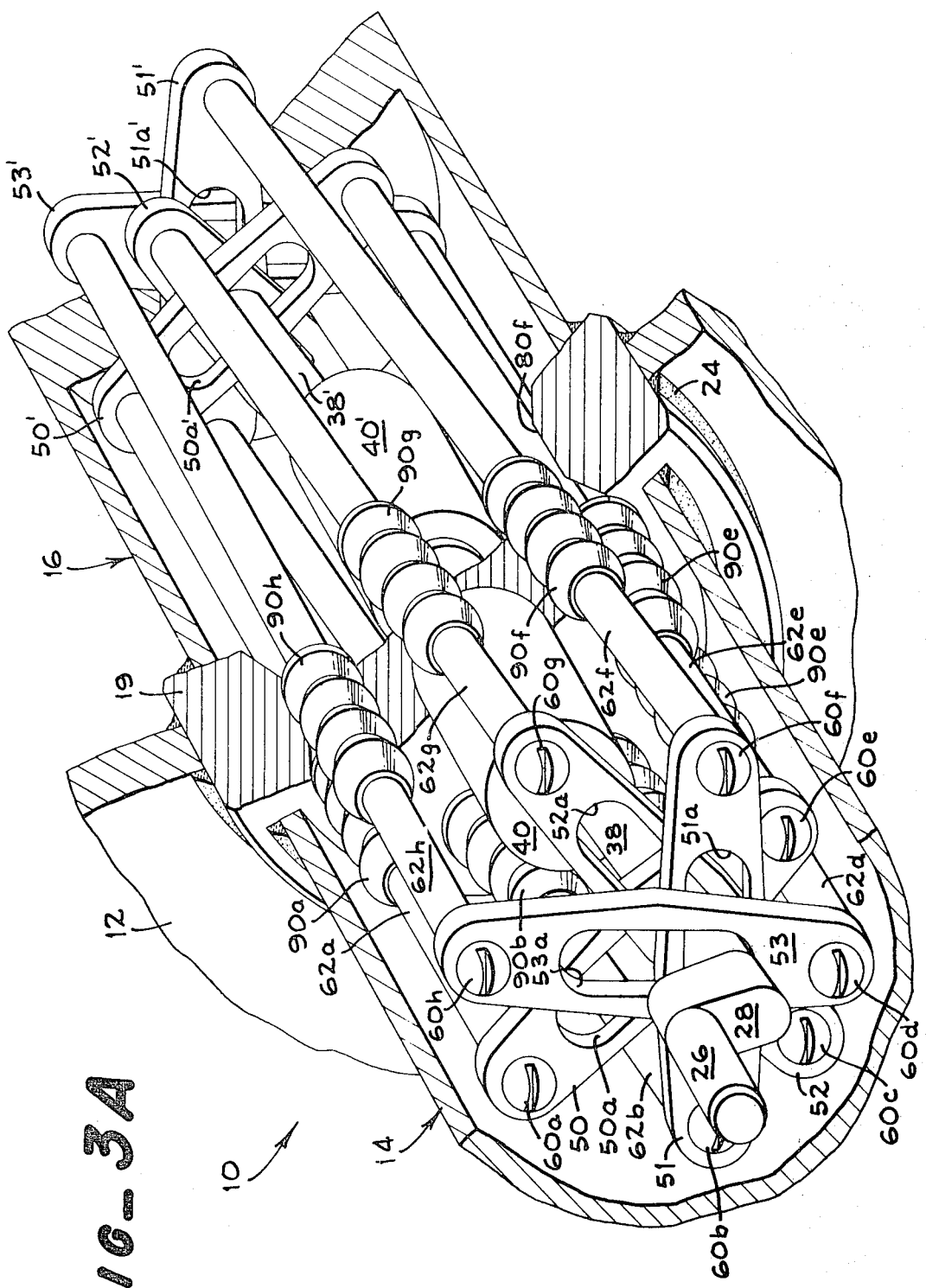

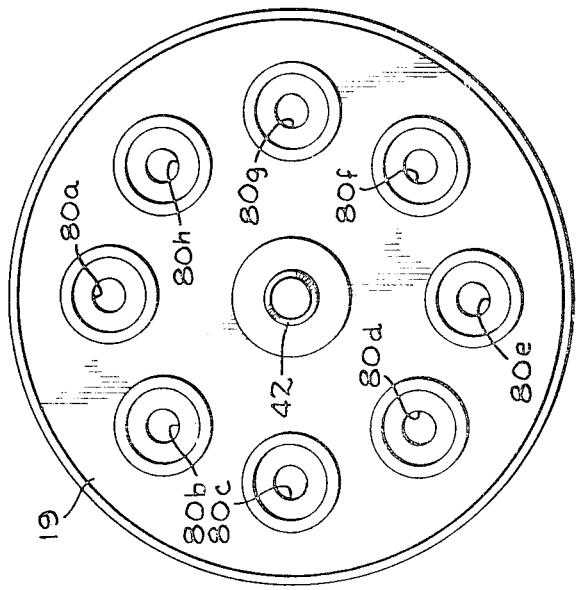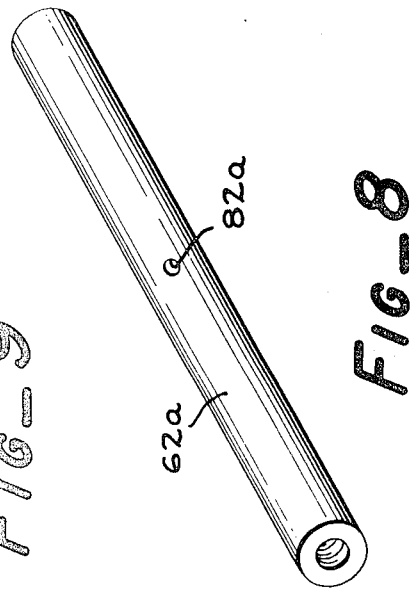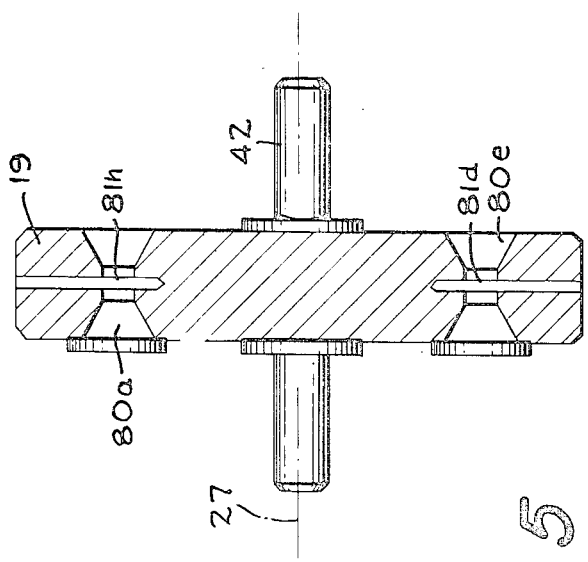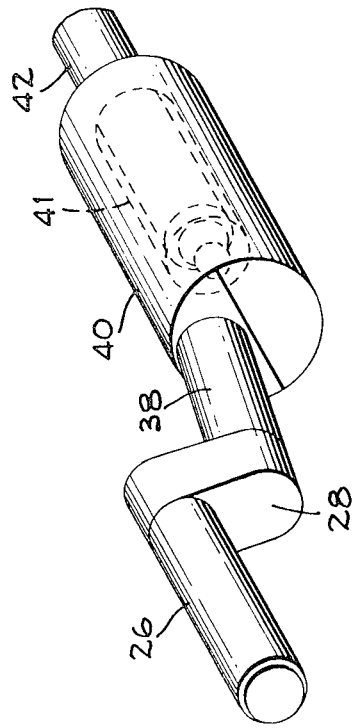

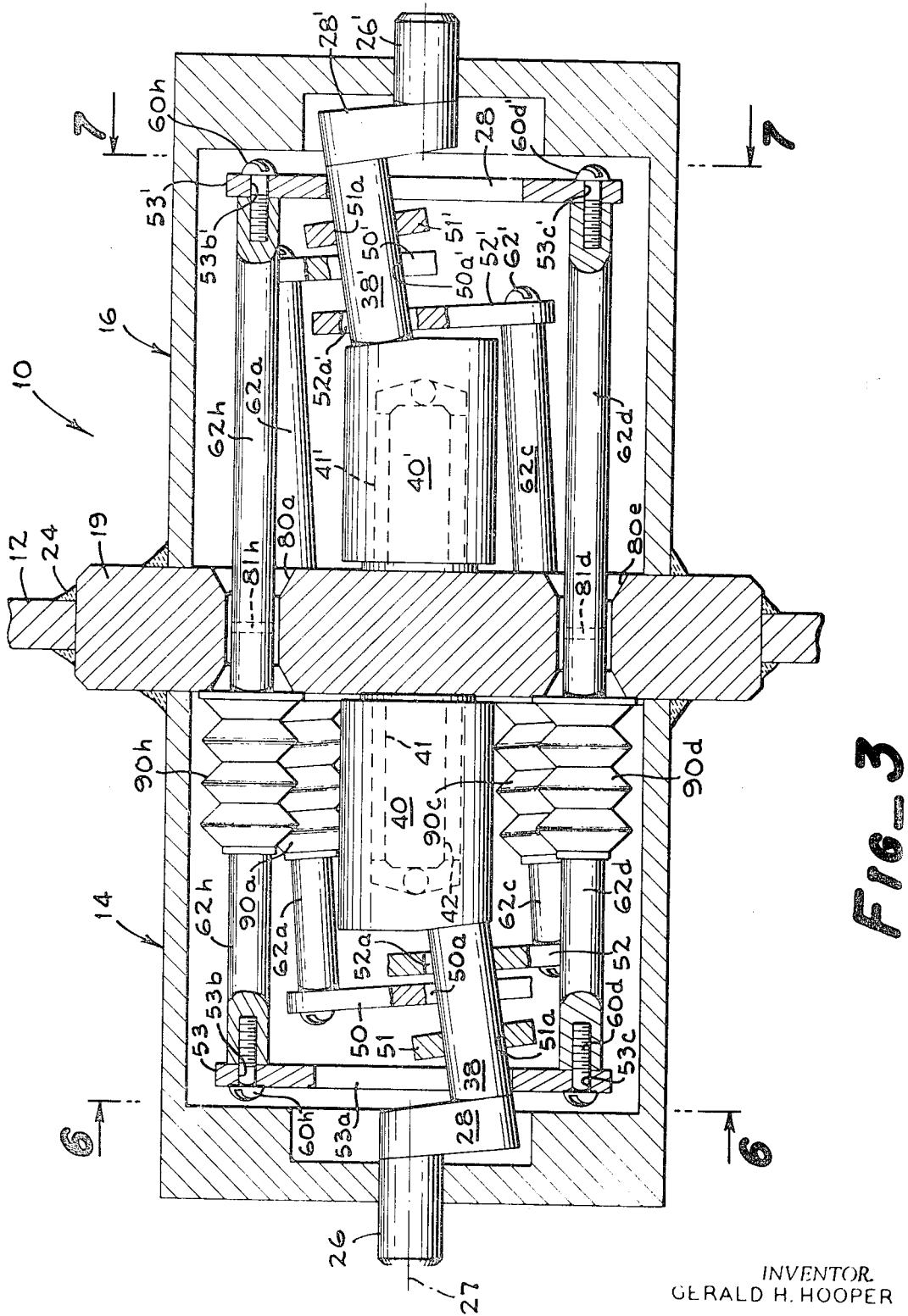

PATENTED FEB 15 1972
3,641,827
SHEET 5 OF 6
Fig_6
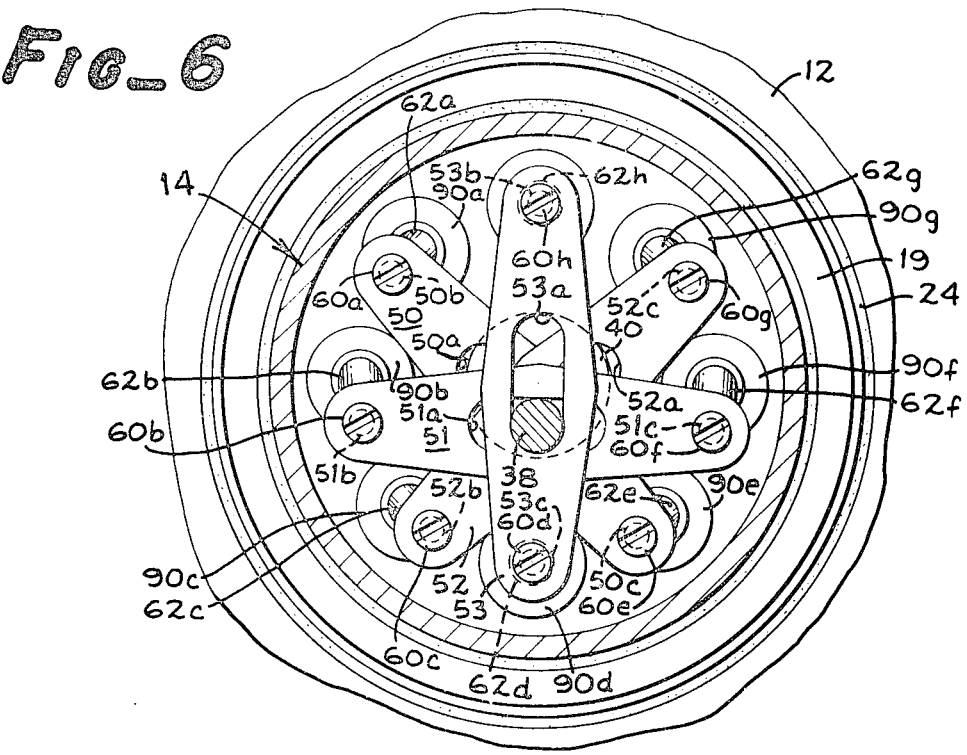
Fig_6A
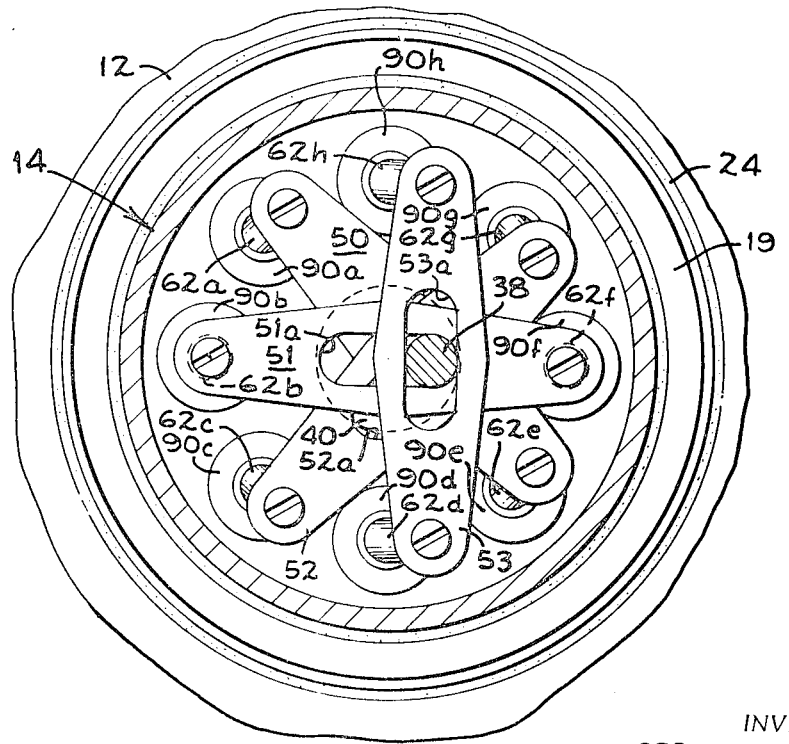
INVENTOR.
GERALD H. HOOPER
BY Jack M. Wiseman
ATTORNEY FIG_7
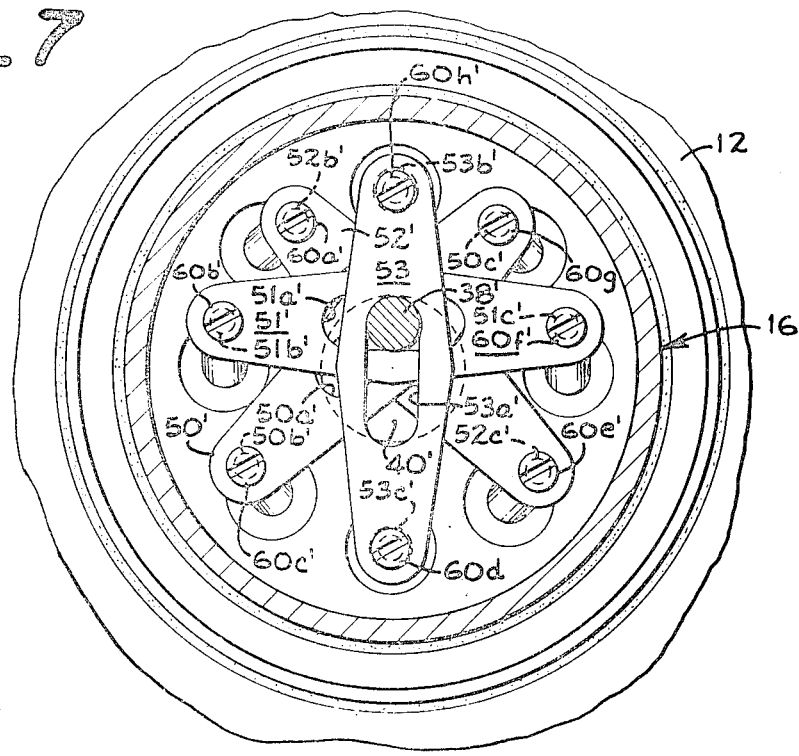
FIG_7A
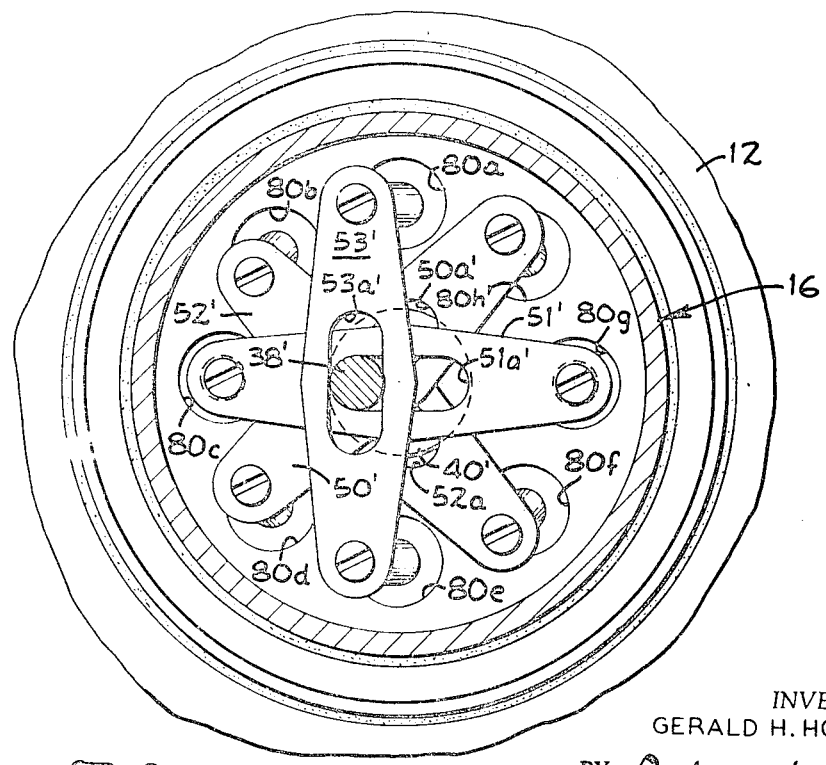
INVENTOR.
GERALD H. HOOPER
BY Jack M. Wiseman
ATTORNEY 3,641,827

1

TORQUE TRANSMITTING APPARATUS

BACKGROUND OF THE INVENTION

The present invention relates to a high torque transmission system for transmitting rotary motion through a partition to or from a hermetically sealed chamber. The apparatus of the present invention has been found to be applicable in apparatus that will maintain near perfect seals. However, such apparatus heretofore have generally been found to be limited to the amount of torque it can handle and most are rotary in nature with the bellows flexing in a conical motion.

SUMMARY OF THE INVENTION

Apparatus for translating the rotary movement of a drive member to a planar pivotal or "seesaw" motion for each of a plurality of torque rods which torque rods, in turn, impart a rotary motion to a driven shaft at the opposite end thereof.

In an exemplary embodiment, the torque rods extend through a bulkhead. The bulkhead may serve as a partition and as a fulcrum for each of the rods and further may be used to form a seal with the partition. A metallic bellows surrounds each of the rods on the side of the partition forming an hermetically sealed chamber and each of the bellows is hermetically sealed to the confronting surface of the bulkhead and the associated rod. On the drive side, the torque rods may be driven by sliding links. Each of the sliding links are actuated by a drive pin. The sliding links extend radially from the drive pin and are disposed in the axial direction in a column, but are spaced angularly relative to one another in the radial direction such that during all movements of the drive pin there is corresponding movement in the torque rods. Thus, each link drives a pair of torque rods, but the links are spaced apart at equal angular distances to define 360°, whereby each link in its motion serves to cover a segment of rotary motion in the driving mode at the drive end of the apparatus. On the driven side of the partition, apparatus forms a mirror image of the drive side. The torque rods impart movement to sliding links which, in turn, operates a drive pin. The drive pin, in turn, drives a driven shaft. At the driven side, each link in its motion serves to cover a segment of rotary motion in the driven mode.

The apparatus of the present invention transmits a relatively high torque through a stationary partition in an hermetically sealed or near perfect vacuum system, and achieves the same at a relative high speed of rotation.

BRIEF DESCRIPTION OF THE DRAWINGS

FIG. 1 is a perspective view of the apparatus of the present invention secured to a wall separating sections of a vacuum chamber;

FIG. 2 is a side elevation view of the apparatus of FIG. 1;

FIG. 3 is an enlarged longitudinal cross-sectional view of the apparatus shown in FIG. 1 taken along the line 3—3 of FIG. 2;

FIG. 3A is an isometric view of the apparatus of the present invention with the housing thereof removed;

FIG. 4 is a perspective view of a crankpin for the apparatus shown in FIG. 3;

FIG. 5 is a sectional view of bulkhead section of the structure of FIG. 3 taken along the line 3—3 of FIG. 2;

FIG. 6 is a vertical sectional view taken along line 6—6 of FIG. 3 to illustrate the torque rods and sliding links employed at one side of the partition in the apparatus of the present invention;

FIG. 6A is similar to FIG. 6 with the crankpin displaced 90°;

FIG. 7 is a vertical sectional view taken along line 7—7 of FIG. 3 to illustrate the torque rods and sliding links employed at the other side of the partition in the apparatus of the present invention;

FIG. 7A is similar to FIG. 7 with the crankpin displaced 90°;

FIG. 8 is a perspective view of a torque rod of the apparatus shown in FIG. 3; and FIG. 9 illustrates a front elevational view of the bulkhead shown in FIG. 5.

DESCRIPTION OF THE PREFERRED EMBODIMENT

Illustrated in FIGS. 1–3 is the torque transmitting apparatus 10 of the present invention. The apparatus 10 may be mounted on a partition or wall 12. One side of the wall 12 is exposed to the atmosphere, and the other side of the wall 12 is exposed to a vacuum chamber. The apparatus 10 includes a first exterior housing 14 and a second exterior housing 16. The housing 14 is sealed by welding or the like to a bulkhead 19, and the housing 16 is mounted to the bulkhead 19. The bulkhead 19 is fixedly secured in place to the fixed wall 12 by means of a heli-arc weld 24 or the like to form a seal therewith.

A drive shaft 26 (FIGS. 1–3) is connected to driving means, e.g., a motor (not shown) to impart rotation thereto in general about an axis 27. The shaft 26 extends through the end wall of the housing 14 and into chamber thereof. As illustrated in FIG. 3, the drive shaft 26 is integral with one end of a generally radially disposed crank arm 28. The other end of the crank arm 28 is fixed or integrally formed with a crankpin 38. In turn, the crankpin 38 is fixed to a cylindrical block 40 (FIG. 4) at a location offset from the axis of the cylindrical block 40. The interior wall of the block 40 carries a press fitted bushing 41. A cylindrical rod 42 (FIG. 3) integral with and supported by the bulkhead 19 supports the block 40 for free rotation about its axis. The rod 42 is coaxial with the axis 27. Accordingly, with the drive shaft 26 driven in rotary motion, the crank arm 28 actuates the crankpin 38 to rotate the crankpin concentrically relative to the axis 27. The cylindrical block 40 rotates about the axis 27, while the rod 42 and bulkhead 19 remain stationary.

The opposite end of the apparatus 10 within the housing 16 is similar in construction to the elements disposed within the housing 14. The motion at one end of the apparatus 10 is duplicated at the opposite end, except that one end may be viewed as the driving end and the other as the driven end. Accordingly, for purposes of clarity, those elements within the housing 16 similar to the elements within the housing 14 have the same reference numerals but with the prime suffix.

As shown in FIGS. 3, 3A, 6 and 7, the offset crankpin 38 is received by slotted openings 50a–53a in a plurality of sliding links 50–53, respectively. In FIGS. 3, 3A, 6A and 7A, it is shown that the offset crankpin 38' is received by slotted openings in a plurality of sliding links 50'–53'. The sliding links 50–53 are formed with a slotted opening 50a–53a, respectively, to receive the crankpin 38. Likewise, the sliding links 50'–53' are formed with a slotted opening 50a'–53a' to receive the crankpin 38'. The dimensions of the slotted openings 50a–53a are selected such that the radius at the curvatures conform with the radius of the crankpin 38, and that the width of the slotted openings 50a–53a conforms with the diameter of the crankpin 38. The longitudinal axis of each of the slotted openings 50a–53a is selected to be less than the outer diameter of the path travelled by the crankpin 38. The sliding links 50–53 are selected to be symmetrical about the axis 27 when the centers of the slotted openings 50a–53a coincide with the axis 27. The sliding links 50–53 are disposed in a column in the axial direction but are spaced-apart angularly relative to one another in the radial direction. More specifically, the sliding links 50–53 are disposed radially and are spaced apart at equal angular distances relative to one another to define 360°. Thus, there are four links with adjacent ends thereof spaced apart 45° from one another. Each link has a pair of operative ends or arms. The above description is equally applicable to the sliding links 50'–53', the pin 38' and the slotted openings 50a'–53a' of the sliding links 50'–53'.

At one end of the sliding links 50–53 (FIGS. 6 and 7) are formed suitable apertures 50b–53b, respectively, and at the other end of the links 50–53 are formed suitable apertures 50c–53. Similarly, formed at one end of the links 50'–53' (FIGS. 6A and 7A) are suitable apertures 50b'–53b' and at the other end of the links 50'–53' are formed suitable apertures 50c'-53c'. Connected to the links 50-53 at their respective apertures 50b-53b and 50c-53c through pins or screws 60a-60, respectively, are torque rods 62a-62h, respectively. The torque rods 62a-62h are also connected to the links 50'-53' at their respective apertures 50b'-53b' and 50c'-53c' through pins or screws 63a-63h. All the rods 62a-62h are similar in construction. The rod 62a is illustrated in detail in FIG. 8. Thus, in the apparatus 10, each of the sliding links 50-53 actuates a pair of torque rods. The construction and operation for the rods and links in the housing 16 are similar to that above disclosed, excepting that each link is actuated by a pair of torque rods.

From the foregoing, it is to be observed that the sliding links 50-53 are moved radially relative to the axis 27 through the actuating action of the crankpin 38. The sliding links 50-53 move simultaneously, and are spaced-apart angularly to define 360° with adjacent arms spaced apart at equal angular distances, such as 45°. Each sliding link through its diametrically disposed arms actuate a pair of torque rods. Through this action, a planar pivotal motion or "seesaw" motion is imparted to the torque rods 62a-62h, respectively, through the sliding links 50-53. The torque rods 62a-62h, in effect, define a rotary span of 360° with each torque rod covering a segment of the rotary span, such as 45°. It is to be observed, however, that the torque rods 62a-62h, respectively, do not rotate, but rather pivot in a plane in a "seesaw" motion.

At the driven end, the pivoting torque rods 62a-62h impart sliding radial movement to the sliding links 50'-53'. More specifically, each pair of torque rods is secured to the diametrically opposite disposed arms of the associated sliding link of the links 50'-53' to impart a radial sliding movement thereto with respect to the axis 27. This action causes the crankpin 38' to move over a concentric path with respect to the axis 27. Since the driven sliding links 50'-53' define 360° and are spaced apart equal angular distances so that each arm thereof covers a segment of motion and since the driving links 50'-53' are actuated simultaneously, the sliding links 50'-53' impart a movement to the crankpin 38' over its complete path. In turn, the crankpin 38' actuates the crank arm 28' causing the same to impart rotation to the driven shaft 26'.

The bulkhead 19, as illustrated in FIGS. 3, 3A, 5 and 9, is formed with a plurality of apertures 80a-80h spaced radially apart 45° relative to one another about the axis 27. Each of the apertures 80a-80h form a pair of clearing counterboxes or conical interior wall structures meeting at the center and fanning outwardly toward the exterior of each of the face surfaces of the bulkhead 19. The torque rods 62a-62h extend through associated apertures 80a-80h, respectively, such that their opposite ends are connected to associated sliding links 50-53 and 50'-53'. The rods 62a-62h are connected to the bulkhead 19 by key pins 81a-81h extending through apertures 82a-82, respectively, of the rod 62a-62h and to apertures 80a-80 of the bulkhead. The conically shaped surfaces of the apertures 80a-80b allows the rods 62a-62h to pivot about the bulkhead 19 and about the pins 81a-81h to serve as the fulcrum for the rod 60a-60h and allows them respectively to be pivoted in a plane and to be laterally displaced about the fulcrum in a planar pivotal or "seesaw" motion. Thus, the rotary motion of the drive shaft 26 is translated into a linear motion through the torque rods 62a-62h at the driven end and the linear motion is translated into a rotary motion at the driven end. In the illustrated embodiment, the motion of the torque rods 62a-62h is in the order of a maximum of 7½° bilateral "seesaw" movement.

Surrounding each of the torque rods 62a-62h and encircling the associated apertures 80a-80h at the side of the bulkhead 19 exposed to a vacuum chamber are stainless steel bellows 90a-90h. Each of the bellows 90a-90h is welded to the bulkhead 19 surface and to the associated torque rod 62a-62h about one end thereof. Accordingly, there is a hermetic seal about the bellows 90a-90h and the bulkhead 19 at the area of intersection of the associated rods 62a-62h and bulkhead 19. In the apparatus 10, there are eight bellows 90a-90h in the housing 14.

In operation, the drive shaft 26 is driven from an independent source about the axis 27 to rotate the crankpin 38 through the crank arm 28. The crankpin 38 travels concentrically about the axis 27 in response to the movement of the drive shaft 26 through the crank arm 28. The sliding links 50-53 are shifted radially from the movement of the crank pin 38. In turn, the sliding links 50-53 cause the rods 62a-62d to pivot to provide for the respective torque rods a planar pivotal or "seesaw" motion with the bulkhead 19 serving as the fulcrum to translate the movement of the rods 62a-62d into a linear movement. The "seesaw" motion of the rods 62a-62d actuates the sliding links 50'-53'. This action causes the crankpin 38' to travel over a concentric path with the axis 27. The crankpin 38' rotates the crank arm 28'. In turn, the shaft 26' is driven through the crank arm 28' for rotation which, in turn, serves to drive a load. The driven shaft 26' is driven with relatively high torque at a relatively high speed of rotation. Accordingly, the present invention provides a device for transmission of rotational movement across a stationary partition in a system with hermetic seals about the rotary elements while providing hermetic seals between the chambers on opposite sides of the partition. The device has been found to provide a leaktight joint in the order of $1 \times 10^{-9}$ torr., and provides a relatively high drive torque. The output torque can be regulated by varying the offset distance of the crankpin 38 relative to the axis 27.

I claim:

1. Apparatus for transmitting torque comprising, in combination:
   drive means having a shaft rotatable about an axis;
   a pin connected to said drive means to be actuated thereby, said pin being movable along a concentric path relative to said axis;
   a plurality of links, each of said links being formed with a slotted opening receiving said pin, each of said links being radially disposed from said pin and actuated for movement in the radial direction in response to the movement of said pin;
   a torque rod connected to each of said links for movement therewith, said torque rods, respectively, having a pivotal movement within a plane imparted thereto through the radial movement of its associated link;
   means for connecting said torque rods to a load for driving the load.

2. Apparatus as claimed in claim 1 wherein said links are spaced apart in the radial direction at angular distances to cover 360°.

3. Apparatus as claimed in claim 2 wherein said links are formed with arms and wherein said torque rods are connected to said arms, respectively.

4. Apparatus as claimed in claim 3 wherein said links are actuated simultaneously by said pin.

5. Apparatus of claim 1 in which said drive means includes an arm connected at one end thereof to said shaft for actuation and connected at the other end thereof to one end of said pin for imparting a concentric movement to said pin relative to said axis.

6. Apparatus as claimed in claim 1 and comprising a partition having a plurality of apertures extending therethrough, said apertures being disposed radially relative to said axis, said torque rods extending through said apertures, respectively, each of said apertures establishing a fulcrum for the pivotal movement of the associated torque rod.

7. Apparatus as claimed in claim 5 and comprising a partition having a plurality of apertures extending therethrough, said apertures being disposed radially relative to said axis, said torque rods extending through said apertures, respectively, each of said apertures establishing a fulcrum for the pivotal movement of the associated torque rod.

8. Apparatus as claimed in claim 7 and comprising a block connected at one end to the other end of said pin for supporting said pin for concentric movement, and means fixed to said partition for supporting the other end of said block for rotation about said axis.

9. Apparatus of claim 8 and comprising a bellows surrounding each torque rod and sealed to one side of said partition and to the associated torque rod.

10. Apparatus of claim 9 in which the apertures within the partition are formed with boxes having interior walls fanning outwardly about the opposite sides of the partition.

11. Apparatus of claim 8 in which said means for supporting said block is a rod fixed to said partition and coaxial with said axis.

12. Apparatus of claim 6 and comprising housing means hermetically sealed and secured to said partition to surround torque rods, said links, and said pin.

13. Apparatus as claimed in claim 4 wherein said means for driving the load comprises a second plurality of links formed with arms, said torque rods being connected to said arms, respectively, of said second links, said second links being spaced apart in the radial direction at angular distances to cover 360° and being actuated simultaneously by said torque rods, each of said links being formed with a slotted opening, and a second pin received by said slotted openings of said links, each of said links being radially disposed from said second pin for moving said second pin over a path concentric with said axis in response to actuation by said torque rods.

14. Apparatus as claimed in claim 13 wherein said means for driving the load comprises a crank arm connected to said pin, the movement of said second pin imparts movement to said crank arm, and a shaft connected to said crank arm and load, said shaft being rotated in response to the movement of said crank arm to impart a rotary movement to the load.

\* \* \* \* \*